United States Patent
Namiki

(10) Patent No.: US 12,113,357 B2
(45) Date of Patent: Oct. 8, 2024

(54) CONTROL SERVER, TRACKING SYSTEM, COMMUNICATION METHOD, AND NON-TRANSITORY RECORDING MEDIUM

(71) Applicant: Hitoshi Namiki, Kanagawa (JP)

(72) Inventor: Hitoshi Namiki, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 392 days.

(21) Appl. No.: 17/696,859

(22) Filed: Mar. 17, 2022

(65) Prior Publication Data
US 2022/0302751 A1 Sep. 22, 2022

(30) Foreign Application Priority Data
Mar. 22, 2021 (JP) .................. 2021-047878

(51) Int. Cl.
H02J 13/00 (2006.01)
G05B 15/02 (2006.01)
H02J 3/38 (2006.01)

(52) U.S. Cl.
CPC ........ *H02J 13/00034* (2020.01); *G05B 15/02* (2013.01); *H02J 3/381* (2013.01); *H02J 13/00002* (2020.01); *H02J 2300/20* (2020.01)

(58) Field of Classification Search
CPC ............... H02J 13/00034; H02J 3/381; H02J 13/00002; H02J 2300/20; H02J 13/00004; H02J 2310/52; H02J 3/14
See application file for complete search history.

(56) References Cited

U.S. PATENT DOCUMENTS

2016/0091912 A1* 3/2016 Stanlake ............ G05F 1/66
700/295
2016/0099565 A1* 4/2016 Tseng ............... H02J 3/14
307/24

FOREIGN PATENT DOCUMENTS

| JP | 2013-102637 | 5/2013 |
| JP | 2014-054123 A | 3/2014 |
| JP | 2015057947 A * | 3/2015 |

(Continued)

OTHER PUBLICATIONS

Office Action issued Oct. 3, 2023 in Japanese Patent Application No. 2022-072003, 7 pages.

(Continued)

*Primary Examiner* — Mohammad Ali
*Assistant Examiner* — Dhruvkumar Patel
(74) *Attorney, Agent, or Firm* — XSENSUS LLP

(57) ABSTRACT

A server includes circuitry to receive data from plural control devices of a plural users. The data from each control device includes consumption records of electric devices. The circuitry determines whether an amount consumed by the plural users is greater than one provided by producers, and based on a determination, calculates a reduction amount for each of one or more users, according to an order of a priority set on the plural users from a top to one until a condition is satisfied. For each of the one or more users, the circuitry determines, a specific electric device and a reduction amount of the specific electric device, based on the data and reference data, and generates consumption control data including information on the specific electric device and the reduction amount. The circuitry transmits to, each of specific control devices of the one or more users, the consumption control data.

6 Claims, 9 Drawing Sheets

(56) References Cited

FOREIGN PATENT DOCUMENTS

| | | |
|---|---|---|
| JP | 2019-144851 | 8/2019 |
| JP | 2019170037 A * | 10/2019 |
| JP | 6842025 B1 | 3/2021 |
| WO | 2014/038327 A1 | 3/2014 |

OTHER PUBLICATIONS

Office Action issued Oct. 26, 2021 in Japanese Patent Application No. 2021-047878, 4 pages.

\* cited by examiner

FIG. 7
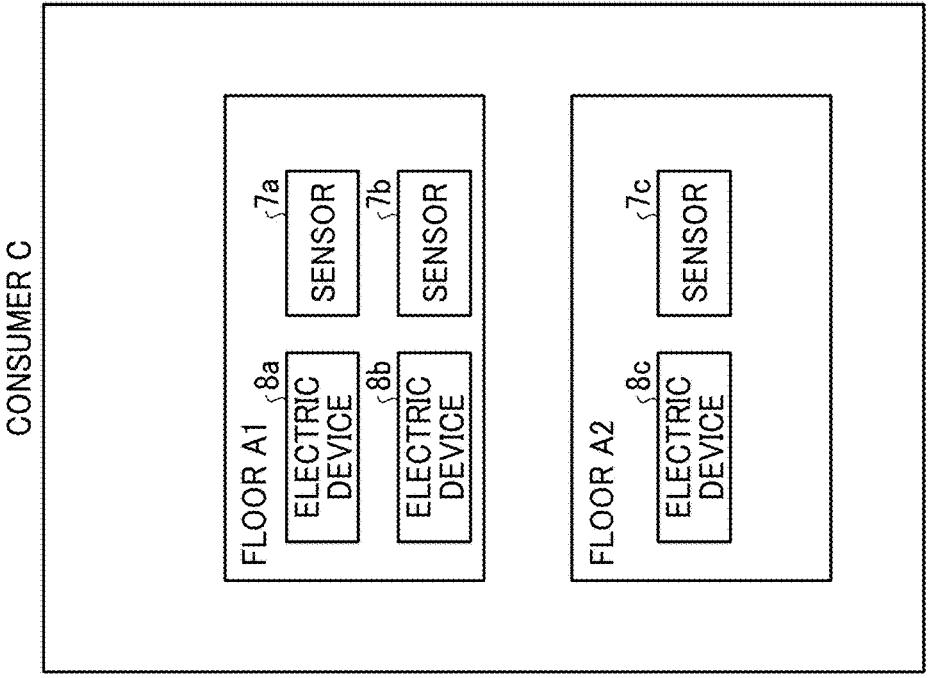
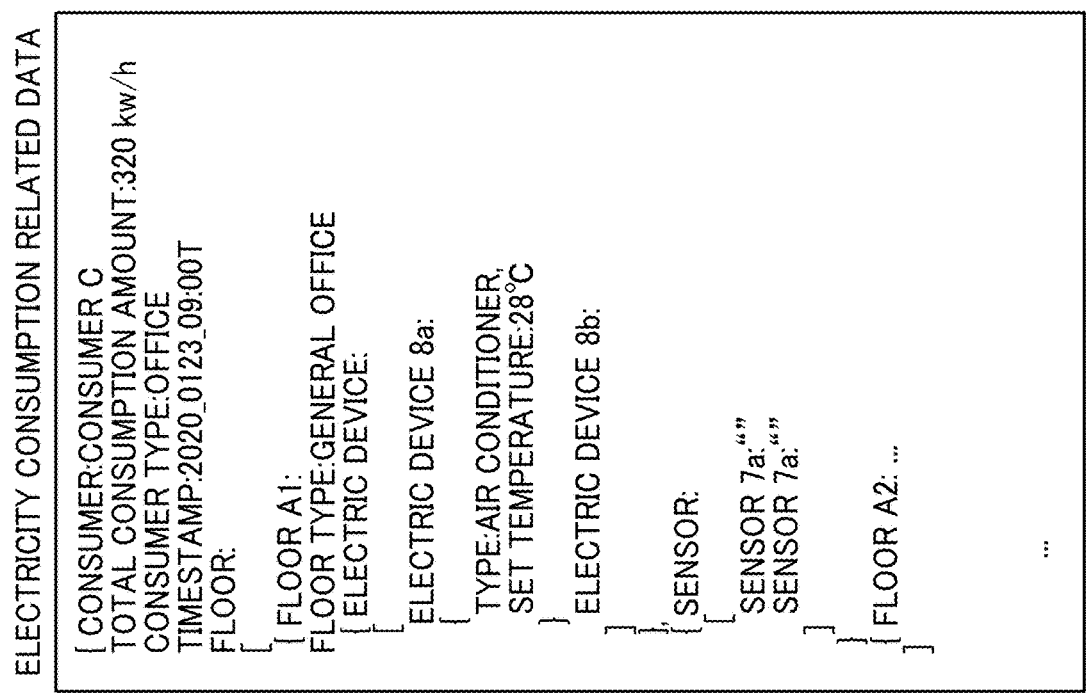

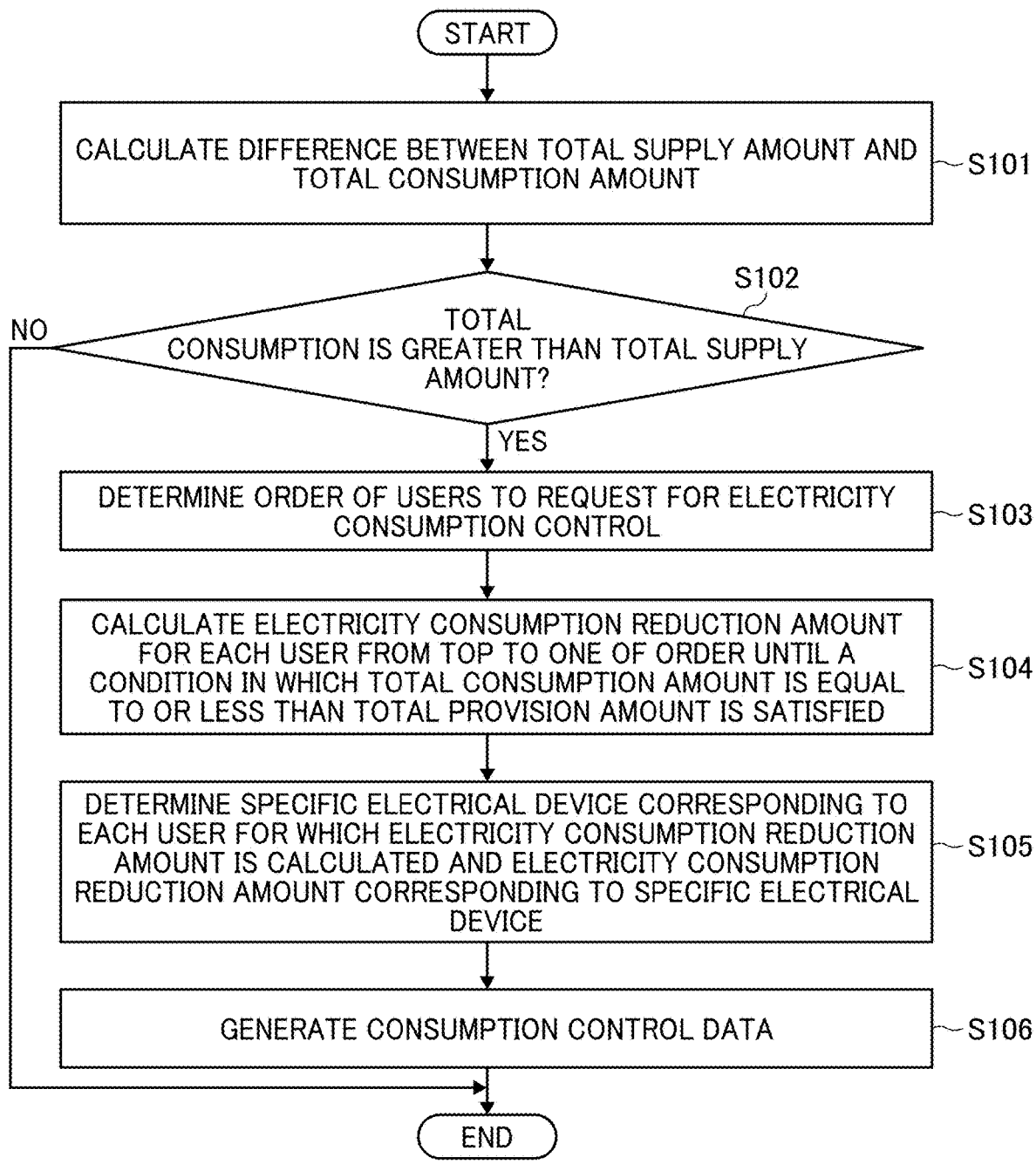

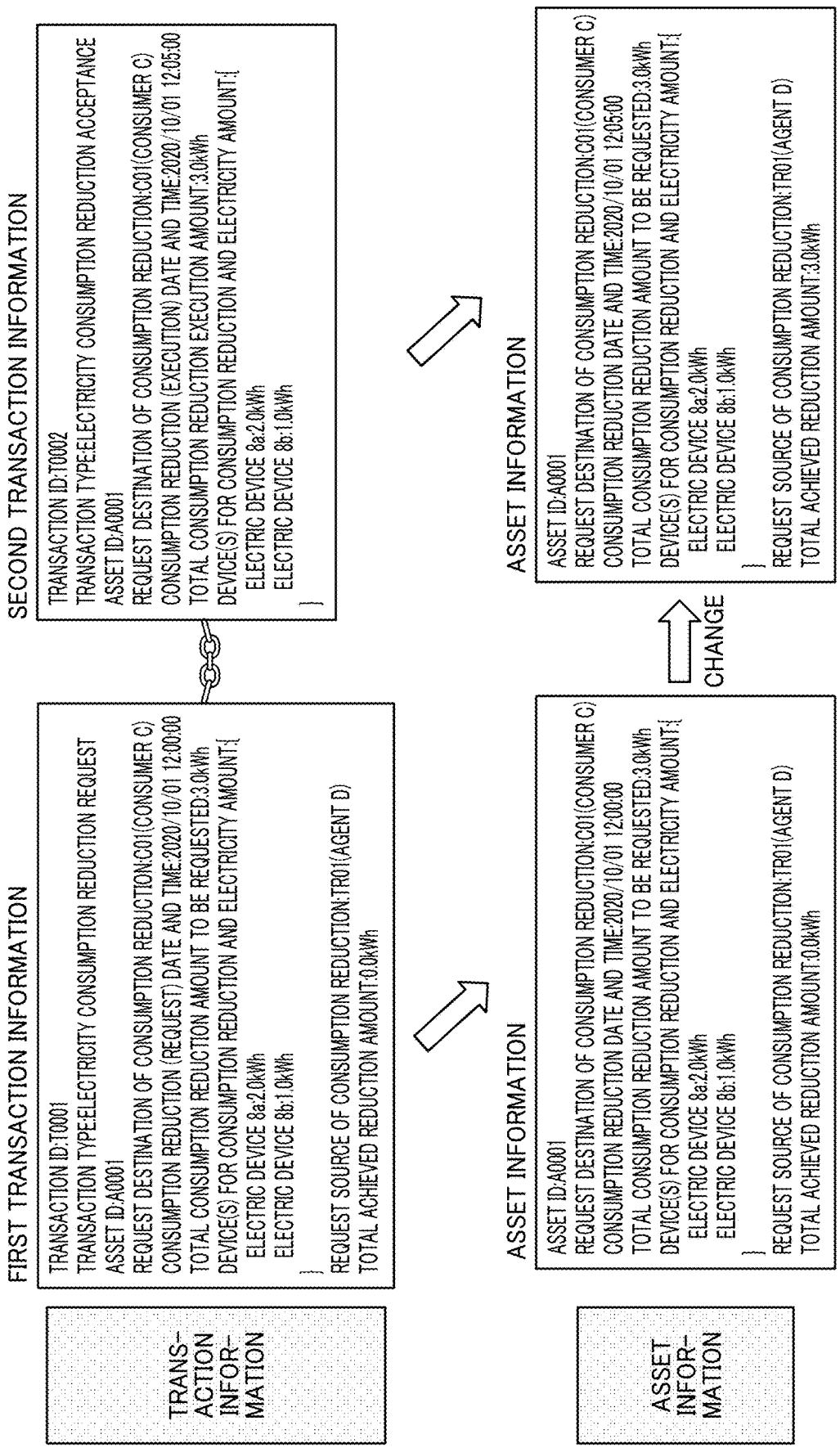

CONTROL SERVER, TRACKING SYSTEM, COMMUNICATION METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2021-047878, filed on Mar. 22, 2021, in the Japan Patent Office, the entire disclosure of which is hereby incorporated by reference.

BACKGROUND

Technical Field

Embodiments of the present disclosure relate to a control server, a tracking system, a communication method, and a non-transitory recording medium.

Related Art

Currently, electricity produced from renewable energy has been attracting attention. In this disclosure, the electricity produced from renewable energy is defined as electricity produced from a subset of renewable resources such as solar (solar light or solar heat), wind power, biomass, geothermal power, hydropower, and heat in the atmosphere. Compared to the case where the fossil fuel such as oil, coal, or liquefied natural gas is used to produce electricity, production of electricity using renewable energy emits almost no carbon dioxide ($CO_2$), which is a cause for global warming. That is, renewable energy is an energy resource that is environmentally friendly, from among various energy resources used for producing electricity today. By operating such as factories using the above-described electricity based on the renewable energy, which is environmentally friendly, companies can increase brand credibility.

A method for using a blockchain technology to trade electricity produced from renewable energy is known. The blockchain technology may be referred to as a distributed ledger technology. With the blockchain technology, plural ledgers each indicating a record of transaction in relation to the electricity are associated with each other by using plural nodes (computers), and data on the transaction records is prevented from being falsified, accordingly. By using such a technology for managing records of electricity transaction, such records are expected to be used as evidence indicating how much renewable energy is used by a company, where the renewable energy is generated, and how much the company contributes to the environment.

Regarding the electricity transaction, in order to achieve stable usage of electricity, an amount of electricity to be consumed and an amount of electricity to be produced are desired to be adjusted in real time (securing balancing between supply and demand of the electricity).

SUMMARY

An exemplary embodiment of the present disclosure includes a control server including circuitry to receive, via a communication network, electricity consumption related data from a plurality of consumption control devices of a plurality of users. The electricity consumption related data of each consumption control device includes records of electricity consumption of one or more electric devices of a corresponding one of the plurality of users. The circuitry determines whether a total amount of electricity consumed by the plurality of users is greater than a total amount of electricity provided by a plurality of producers. Based on a determination that the total amount of electricity consumed is greater than the total amount of electricity provided, the circuitry calculates a first electricity consumption reduction amount for each of one or more users of the plurality of users, according to an order of a priority set on the plurality of users from a top to one until a condition is satisfied. The condition is that the total amount of electricity consumed is equal to or less than the total amount of electricity provided. The circuitry determines, for each of the one or more users, one or more specific electric devices among from the one or more electric devices and a second consumption reduction amount of each of the one or more specific electric devices, based on the electricity consumption related data and reference data. The circuitry generates, for each of the one or more users, consumption control data including information on the one or more specific electric devices and the second electricity consumption reduction amount of each of the one or more specific electric devices. The circuitry transmits to, each of specific one or more consumption control devices of the one or more users, the consumption control data to cause each of the one or more consumption control devices to perform electricity consumption control in relation to the one or more specific electric devices.

An exemplary embodiment of the present disclosure includes a tracking system including a control server and a consumption control device. The control server includes receive, via a communication network, electricity consumption related data from a plurality of consumption control devices of a plurality of users. The electricity consumption related data of each consumption control device includes records of electricity consumption of one or more electric devices of a corresponding one of the plurality of users. The circuitry determines whether a total amount of electricity consumed by the plurality of users is greater than a total amount of electricity provided by a plurality of producers. Based on a determination that the total amount of electricity consumed is greater than the total amount of electricity provided, the circuitry calculates a first electricity consumption reduction amount for each of one or more users of the plurality of users, according to an order of a priority set on the plurality of users from a top to one until a condition is satisfied. The condition is that the total amount of electricity consumed is equal to or less than the total amount of electricity provided. The circuitry determines, for each of the one or more users, one or more specific electric devices among from the one or more electric devices and a second electricity consumption reduction amount of each of the one or more specific electric devices, based on the electricity consumption related data and reference data. The circuitry generates, for each of the one or more users, consumption control data including information on the one or more specific electric devices and the second electricity consumption reduction amount of each of the one or more specific electric devices. The circuitry transmits to, each of specific one or more consumption control devices of the one or more users, the consumption control data to cause each of the one or more consumption control devices to perform electricity consumption control in relation to the one or more specific electric devices. The consumption control device is included in the one or more specific one of the plurality of consumption control devices. The consumption control device includes consumption control device circuitry to transmit, to the control server, the electricity consumption related data.

The consumption control device circuitry receives, from the control server, the consumption control data, and outputs, to the one or more specific electric devices, setting change data for performing consumption control of the one or more specific electric devices. The setting change data is based on the consumption control data received from the control server.

An exemplary embodiment of the present disclosure includes a communication method. The communication method includes receiving, via a communication network, electricity consumption related data from a plurality of consumption control devices of a plurality of users. The electricity consumption related data of each consumption control device includes records of electricity consumption of one or more electric devices of a corresponding one of the plurality of users. The method includes determining whether a total amount of electricity consumed by the plurality of users is greater than a total amount of electricity provided by a plurality of producers. The method includes, based on a determination that the total amount of electricity consumed is greater than the total amount of electricity provided, calculating a first electricity consumption reduction amount for each of one or more users of the plurality of users, according to an order of a priority set on the plurality of users from a top to one until a condition is satisfied. The condition is that the total amount of electricity consumed is equal to or less than the total amount of electricity provided. The method includes determining, for each of the one or more users, one or more specific electric devices among from the one or more electric devices and a second electricity consumption reduction amount of each of the one or more specific electric devices, based on the electricity consumption related data and reference data. The method includes generating for each of the one or more users, consumption control data including information on the one or more specific electric devices and the second electricity consumption reduction amount of each of the one or more specific electric devices. The method includes transmitting to, each of specific one or more consumption control devices of the one or more users, the consumption control data to cause each of the one or more consumption control devices to perform electricity consumption control in relation to the one or more specific electric devices.

An exemplary embodiment of the present disclosure includes a non-transitory recording medium storing a plurality of instructions which, when executed by one or more processors, causes the processors to perform a method. The method includes receiving, via a communication network, electricity consumption related data from a plurality of consumption control devices of a plurality of users. The electricity consumption related data of each consumption control device includes records of electricity consumption of one or more electric devices of a corresponding one of the plurality of users. The method includes determining whether a total amount of electricity consumed by the plurality of users is greater than a total amount of electricity provided by a plurality of producers. The method includes, based on a determination that the total amount of electricity consumed is greater than the total amount of electricity provided, calculating a first electricity consumption reduction amount for each of one or more users of the plurality of users, according to an order of a priority set on the plurality of users from a top to one until a condition is satisfied. The condition is that the total amount of electricity consumed is equal to or less than the total amount of electricity provided. The method includes determining, for each of the one or more users, one or more specific electric devices among from the one or more electric devices and a second electricity consumption reduction amount of each of the one or more specific electric devices, based on the electricity consumption related data and reference data. The method includes generating for each of the one or more users, consumption control data including information on the one or more specific electric devices and the second electricity consumption reduction amount of each of the one or more specific electric devices. The method includes transmitting to, each of specific one or more consumption control devices of the one or more users, the consumption control data to cause each of the one or more consumption control devices to perform electricity consumption control in relation to the one or more specific electric devices.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a schematic diagram of electricity consumption related data according to the exemplary embodiment;

FIG. 8 is a flowchart illustrating a process of generating consumption control data according to the exemplary embodiment; and FIG. 9 is a conceptual diagram illustrating transaction information and asset information according to the exemplary embodiment.

Figure 1:
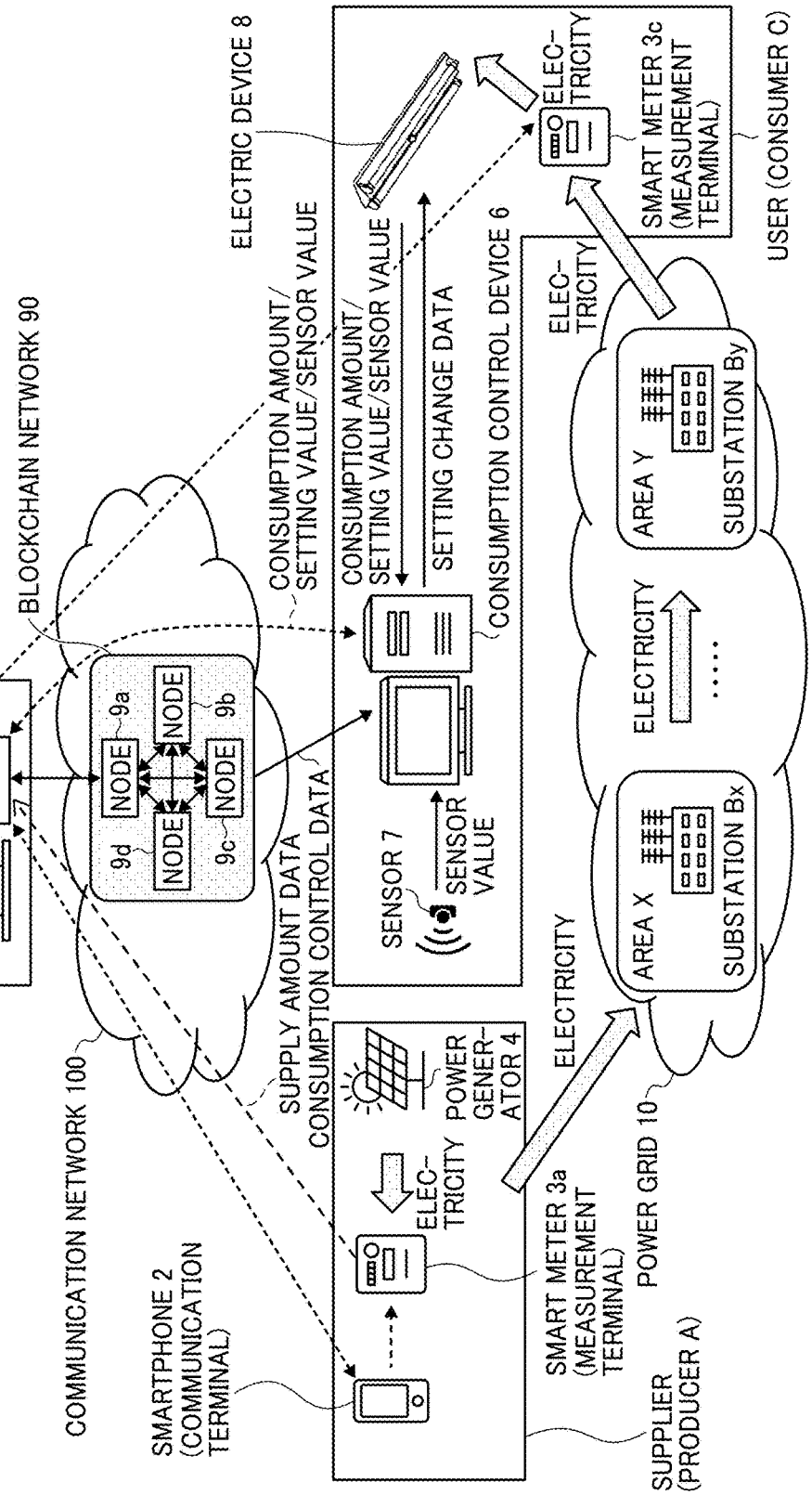
FIG. 1 is a schematic view illustrating an example of tracking system according to an exemplary embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

An embodiment of the present disclosure is described hereinafter with reference to the attached drawings.

Overview of System Configuration:

First, an overview of a configuration of a tracking system 1 is described according to one or more exemplary embodiments. FIG. 1 is a schematic view illustrating an example of tracking system according to the present embodiment. In the description of the present embodiment, a case in which electricity is used as an example of an asset is described. In this description of the present embodiment, the asset is an item that has value. The ownership of the asset and the production method of the asset are managed using asset information described later. Since the electricity, as an example of energy, is used as the asset in the example, asset information may be referred to as energy information. Further, as described below, transaction information is generated to generate or change the asset information. Since the transaction information is used to track ownership of the asset, the transaction information may be referred to as tracking information.

Explanation on Each Entity in tracking System:

As illustrated in FIG. 1, the tracking system 1 is used by a producer A of electricity, a consumer C of electricity, and an intermediary agent D.

The producer A, an example of a supplier, is an entity that produces electricity from solar light, as one example of an entity that produces electricity from renewable energy resources. In the description of the present embodiment, electricity produced from renewable energy resources is referred to as green power. In some embodiments, the producer A, an example of a supplier, is an entity that produces electricity from oil as an example of fossil fuel. The supplier may be a union that purchases items from each producer and resells the items.

The consumer C, an example of a user, is an entity that consumes electricity supplied from the producer A. The consumer C is also referred to as an electricity user. In case that the asset is an item that is not consumed like electricity, such as a real estate property, the user may include an owner who currently owns the asset.

The intermediary agent D is an entity that intermediates transfer of ownership of electricity between different entities. An example of the intermediary agent D includes a retail electric utility company.

Electricity production methods can be determined based on, for example, a type of energy resource used to produce electricity. Assuming that the electricity production method is defined by a type of energy resource, examples of electricity production method include a production method using solar (such as solar light or solar heat), a production method using wind (such as wind power), a production method using biomass, a production method using geothermal power, a production method using hydroelectric resources, a production method using heat in the atmosphere, and a production method using nuclear power. Of those various types of electricity production methods, the electricity production methods using renewable energy resources, such as solar light, solar heat, wind power, biomass, geothermal power, hydropower, and heat in the atmosphere are grouped into a production method using renewable energy. The electricity production methods using petroleum (oil), coal, and liquefied natural gas are grouped into a production method using conventional energy such as fossil fuel. Compared to the production method using conventional energy, the production method using renewable energy emits almost no carbon dioxide ($CO_2$), which is a cause for global warming. That is, renewable energy is an energy resource that is environmentally friendly. In this description of the embodiment, as examples of renewable energy resource, solar light, or solar heat (solar power), wind power, biomass, geothermal power, hydropower, and heat in the atmosphere are referred, for descriptive purposes. Further, as examples of conventional energy resource, fossil fuel, such as oil, coal, and liquefied natural gas are referred, for descriptive purposes.

The number of producers may be one or three or more. There may be multiple consumers or intermediary agents.

Power Transmission and Distribution Network:

A substation Bx is a substation nearest to the producer A. A substation By is a substation nearest to the consumer C. A power distribution network 10, which may be referred to as a power grid 10, includes the substations Bx and By, and transmission lines, and distribution lines, etc. The electricity supplied from the producers A is distributed to the consumer C via the power grid 10.

Data Communication Network:

The producer A is equipped with a smartphone 2, a smart meter 3a, and a power generator 4. The consumer C is equipped with a smart meter 3c, a consumption control device 6, a sensor 7, and an electric device 8. The intermediary agent D manages a control server 5. The intermediary agent D may be an organization such as a corporation or an individual (for example, a president, an executive officer, or an employee such as an information technology (IT) system administrator).

The number of smartphones may be more than one, for example, two or four or more, depending on the number of producers and consumers. Further, the number of smart meters 3a, and 3c may be more than two, for example three, depending on the number of producers and consumers. In the description of the present embodiment, the smart meters 3a and 3c may be collectively referred to as the smart meter 3. The number of power generators 4 may be one or two or more, for example, depending on the number of producers.

The number of control servers 5 may be two or more, for example, depending on the number of intermediary agents. Further, the control server 5 may be implemented by a single computer or a plurality of computers. The number of electric devices 8 may be more than one.

As illustrated in FIG. 1, the tracking system 1 that resides on a data communication network includes the plurality of smartphones 2, the plurality of smart meters 3a and 3c, the plurality of power generators 4, the control server 5, a consumption control device 6 (which is one of a plurality of consumption control devices 6), and a plurality of nodes 9a, 9b, 9c, and 9d each implemented by such as a computer. In this embodiment, the nodes 9a, 9b, 9c, and 9d form a blockchain network 90. The blockchain network 90 is formed on the communication network 100 such as the Internet. The communication network 100 includes the Internet, a mobile communication network, a local area network (LAN), and the like. The communication network 100 may include not only a wired communication network but also a wireless communication network such as a mobile communication system (4G, 5G, 6G, etc.) and Worldwide Interoperability for Microwave Access (WiMAX). Although there are actually a large number of nodes exist, only four nodes 9a, 9b, 9c, and 9d are illustrated in the figure for simplicity. In this exemplary embodiment, the nodes 9a, 9b, 9c, and 9d are managed by different organizations such as different companies. The intermediary agent D may be any one of these different organizations. For example, the control server 5 and any one of the nodes 9a, 9b, 9c, and 9d may be managed by the same organization. Hereinafter, the nodes 9a, 9b, 9c, and 9d may be collectively referred to as the node 9.

Next, the terminals and devices of the producer A and the consumer C are described.

Terminals and Devices of Producer A:

The smartphone 2 communicates data with the smart meter 3a by short-range wireless technology such as Near Field Communication (NFC) or BLUETOOTH. Further, the smartphone 2 communicates data with the control server 5 via the communication network 100.

The smart meter 3a communicates data with the control server 5 via the communication network 100. Further, the smart meter 3a measures an amount of electricity produced by the power generator 4, namely an amount of electricity supply (supply amount) from the power generator 4, at regular time intervals (for example, every 30 minutes). Then, the smart meter 3a performs processing such as transmitting data on the amount of electricity supply (power supply) (supply amount data) to the control server 5.

The power generator 4 is a device that generates electricity from a renewable energy resource such as solar light. The power generator 4 is a device that generates electricity from a fossil fuel such as oil.

Terminals and Devices of Consumer C:

The smart meter 3c communicates data with the control server 5 via the communication network 100. Further, the smart meter 3c measures an amount of electricity consumed by the electric device 8 every predetermined time period (for example, every 30 minutes). The smart meter 3c performs processing such as transmitting usage information indicating the amount of electricity consumed, and a duration of time when electricity is consumed, etc., to the control server 5 via the communication network 100.

The consumption control device 6 communicates with the control server 5 via the communication network 100. Further, the consumption control device 6 communicates with the blockchain network 90 formed on the communication network 100. Further, the consumption control device 6 acquires a sensor value from the sensor 7, acquires an amount of electricity (power) consumption (electricity (power) consumption amount) and a setting value from the electric device 8, and outputs setting change data to the electric device 8. When the electric device 8 is a lighting apparatus, the setting value is a brightness value or the like, and when the electric device 8 is an air conditioner, the setting value is a set temperature or the like.

The sensor 7 is a sensor that detects temperature, humidity, and brightness, for example.

Examples of the electric device 8 are, for example, a lighting apparatus, an air conditioner, a refrigerator, a copier. The electric device 8 includes a smart home electric appliance. The electric device 8 changes its own settings based on the setting change data acquired from the consumption control device 6. When the electric device 8 is a lighting apparatus, the electric device 8 changes the brightness according to the setting change data. When the electric device 8 is an air conditioner, the electric device 8 changes the set temperature according to the setting change data.

Control Server of Intermediary Agent D:

The control server 5 performs processing for mediating the electricity transaction between the producer A and the consumer C. Further, the control server 5 accesses the blockchain network 90 to track transaction of asset (electricity transaction, energy transaction). In example operation, the control server 5 accesses the node 9 of the blockchain network 90 to communicate data with the node 9. In the example case of asset being electricity, the tracking system 1 tracks electricity from the supplier to the consumer.

The smartphone 2 is an example of communication terminal of the supplier.

Examples of communication terminal also include smart watches, PCs, and smart glasses. The smart meter 3 is an example of a measuring terminal.

Figure 2:
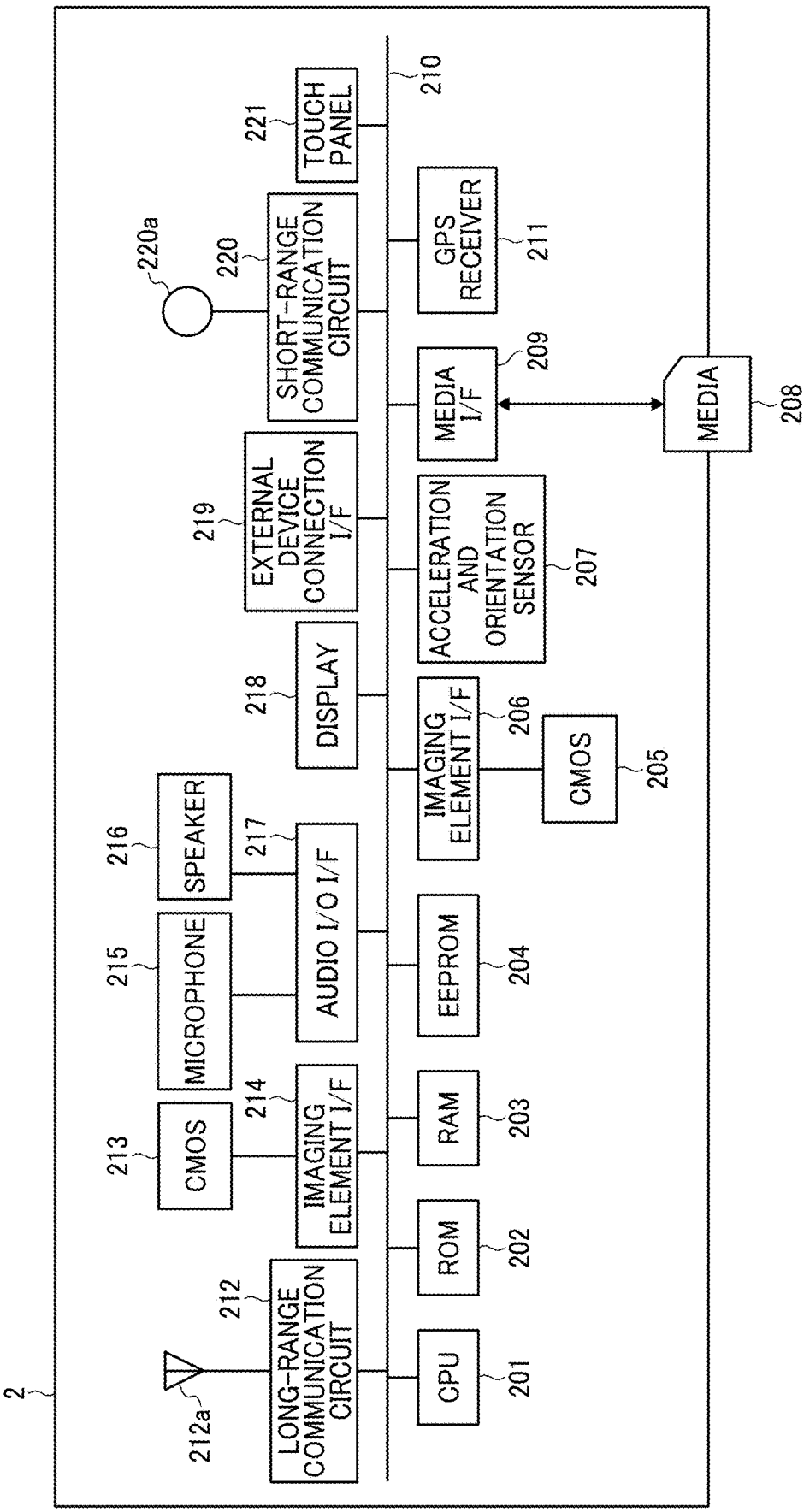
FIG. 2 is a block diagram illustrating a hardware configuration of a smartphone according to the exemplary embodiment.
Figure 3:
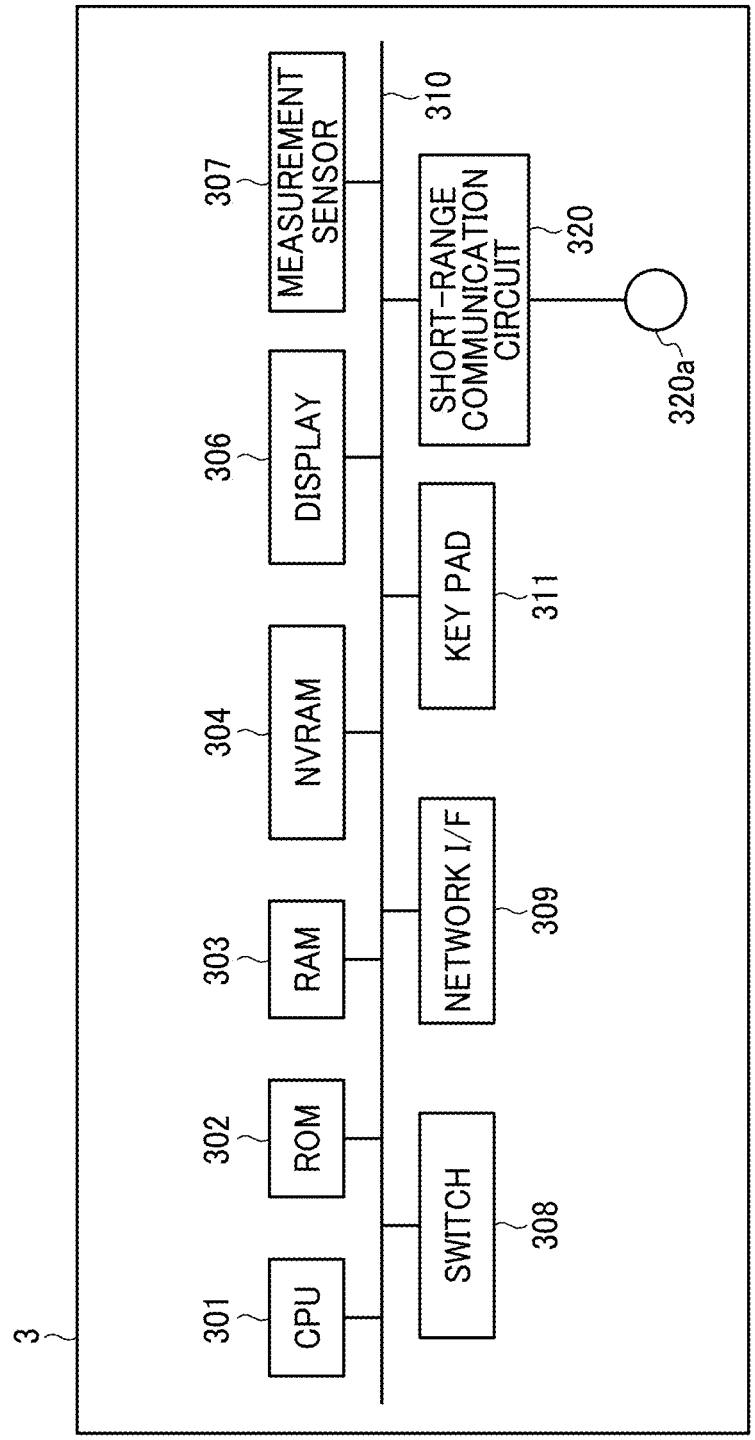
FIG. 3 is a block diagram illustrating a hardware configuration of a smart meter according to the exemplary embodiment.
Figure 4:
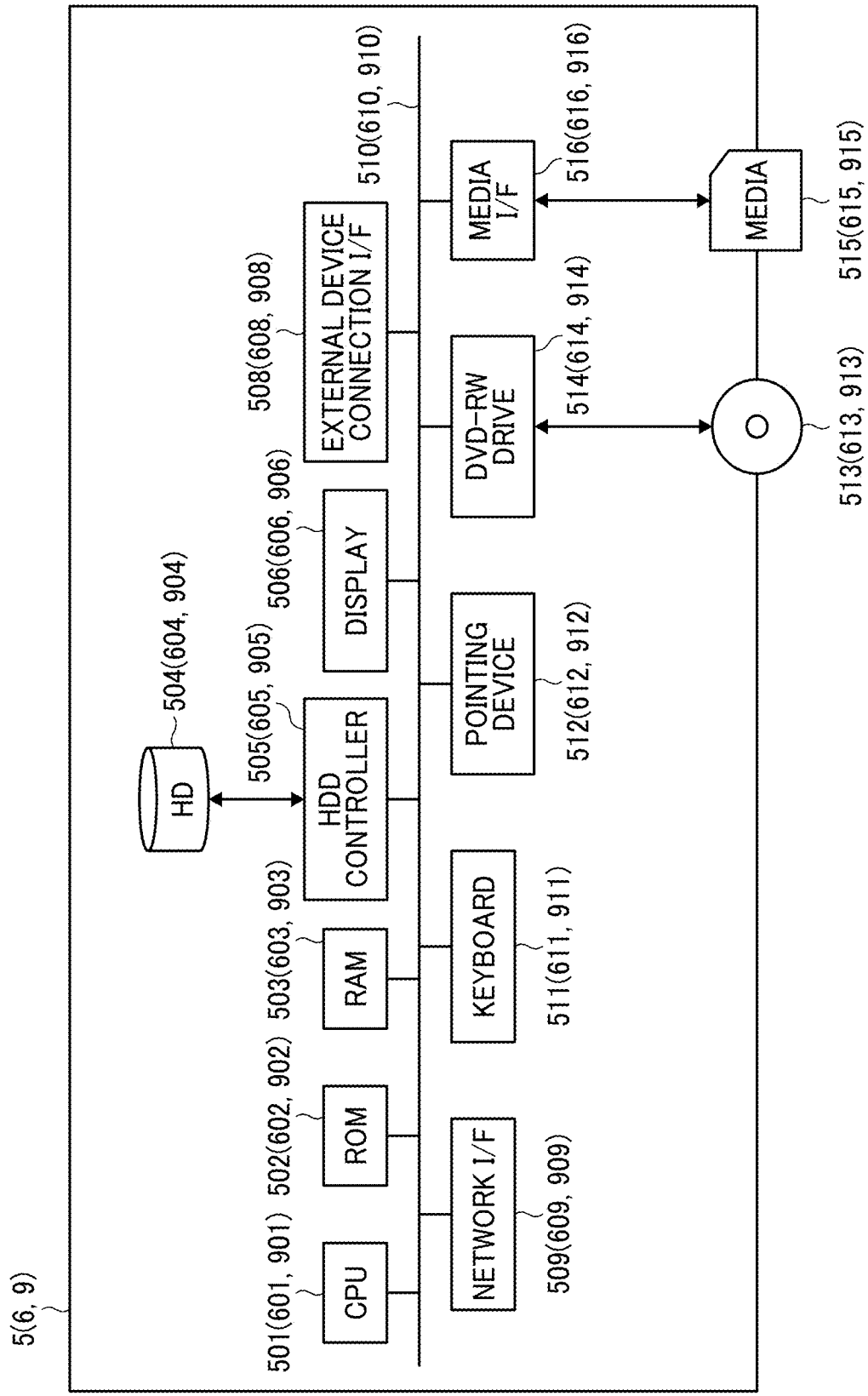
FIG. 4 is a block diagram illustrating a hardware configuration of any one of a control server, a consumption control device, and a node according to the exemplary embodiment.

Hardware Configuration:

Next, referring to FIG. 2 to FIG. 4, hardware configurations of the smartphone 2, the smart meter 3, the control server 5, the consumption control device 6, and the node 9 are described according to the exemplary embodiment.

Hardware Configuration of Smartphone:

FIG. 2 is a schematic diagram illustrating a hardware configuration of a smartphone according to the exemplary embodiment. As illustrated in FIG. 2, the smartphone 2 includes a central processing unit (CPU) 201, a read only memory (ROM) 202, a random access memory (RAM) 203, an Electrically Erasable Programmable ROM (EEPROM) 204, a Complementary Metal Oxide Semiconductor (CMOS) sensor 205, an image sensor interface (I/F) 206, an acceleration and orientation sensor 207, a media I/F 209, and a Global Positioning System (GPS) receiver 211.

The CPU 201 controls entire operation of the smartphone 2. The ROM 202 stores a control program for operating the CPU 201 such as an Initial Program Loader (IPL). The RAM 203 is used as a work area for the CPU 201. The EEPROM 204 reads or writes various data such as a control program for a smartphone under control of the CPU 201. The CMOS sensor 205 is an example of a built-in imaging device that captures an object (mainly, a self-image of a user operating the smartphone 2) under control of the CPU 201 to obtain image data. In alternative to the CMOS sensor 205, an imaging element such as a charge-coupled device (CCD) sensor can be used. The imaging element I/F 206 is a circuit that controls driving of the CMOS sensor 205. The acceleration and orientation sensor 207 includes various sensors such as an electromagnetic compass or gyrocompass for detecting geomagnetism and an acceleration sensor. The media I/F 209 controls reading and writing (storing) of data from and to a storage medium (media) 208 such as a flash memory. The GPS receiver 211 receives a GPS signal from a GPS satellite.

The smartphone 2 further includes a long-range communication circuit 212, a CMOS sensor 213, an imaging element I/F 214, a microphone 215, a speaker 216, an audio input/output I/F 217, a display 218, an external device connection I/F 219, a short-range communication circuit 220, an antenna 220a for the short-range communication circuit 220, and a touch panel 221.

The long-range communication circuit 212 is a circuit that enables the smartphone 2 to communicate with other device through the communication network 100. The CMOS sensor 213 is an example of a built-in imaging device that captures an object under control of the CPU 201 to obtain image data. The imaging element I/F 214 is a circuit that controls driving of the CMOS sensor 213. The microphone 215 is a built-in circuit that converts audio into an electric signal. The speaker 216 is a built-in circuit that generates audio such as music or voice by converting an electric signal into physical vibration. The audio input/output I/F 217 is a circuit for inputting or outputting an audio signal between the microphone 215 and the speaker 216 under control of the CPU

201. The display 218 is an example of a display device that displays an image of the object, various icons, etc. Examples of the display 218 include a liquid crystal display (LCD) and an organic electroluminescence (EL) display. The external device connection I/F 219 is an interface that connects the smartphone 2 to various external devices. The short-range communication circuit 220 is a communication circuit that communicates in compliance with the near field communication (NFC), BLUETOOTH, and the like. The touch panel 221 is an example of an input device that allows a user to operate the smartphone 2 by touching a screen of the display 218.

The smartphone 2 further includes a bus line 210. The bus line 210 is an address bus or a data bus, which electrically connects the components illustrated in FIG. 2 such as the CPU 201.

Hardware Configuration of Smart Meter:

FIG. 3 is a schematic diagram illustrating an example of hardware configuration of the smart meter according to the exemplary embodiment. As illustrated in FIG. 3, the smart meter 3 is provided with a computer. Still referring to FIG. 3, the smart meter 3 includes a CPU 301, a ROM 302, a RAM 303, a non-volatile random access memory (NVRAM) 304, a display 306, a measurement sensor 307, a switch 308, a network I/F 309, a keypad 311, a touch panel 312, a short-range communication circuit 320, and an antenna 320a for the short-range communication circuit 320.

The CPU 301 controls entire operation of the smart meter 3. The ROM 302 stores a control program for driving the CPU 301 such as an IPL. The RAM 303 is used as a work area for the CPU 301. The NV RAM 304 is a non-volatile memory that stores and reads various data such as the control program. The display 306 displays various information such as a cursor, a menu, a window, a character, or an image.

The measurement sensor 307 measures electricity provided or consumed by the smart meter 3. The switch 308 is turned on to close, or turned off to open, the connections in an electric circuit to cause the electric current flow or stop in the electric circuit in the smart meter 3.

The network OF 309 is an interface that controls communication of data through the communication network 100. The keypad 311 is an example of input device provided with a plurality of keys for inputting or selecting characters, numerals, or various instructions. The short-range communication circuit 320 is a communication circuit that enables communication based on short-range wireless technology such as NFC and BLUETOOTH. The bus line 310 is an address bus or a data bus, which electrically connects the components illustrated in FIG. 3 such as the CPU 301.

Hardware Configurations of Control Server:

FIG. 4 is a schematic diagram of a hardware configuration of the control server according to the exemplary embodiment. Each hardware element of the control server 5 is denoted by a reference numeral in 500 series. As illustrated in FIG. 4, the control server 5 is implemented by a computer. Specifically, the control server 5 of FIG. 4 includes a CPU 501, a ROM 502, a RAM 503, a hard disk (HD) 504, a hard disk drive (HDD) controller 505, a display 506, an external device connection I/F 508, a network I/F 509, a bus line 510, a keyboard 511, a pointing device 512, a digital versatile disk rewritable (DVD-RW) drive 514, and a media I/F 516.

The CPU 501 controls entire operation of the server 5. The ROM 502 stores a program such as an Initial Program Loader (IPL) used for driving the CPU 501. The RAM 503 is used as a work area for the CPU 501. The HD 504 stores various data such as a program. The HDD controller 505 controls reading and writing of various data from and to the HD 504 under control of the CPU 501. The display 506 displays various information such as a cursor, a menu, a window, a character, or an image. The external device connection I/F 508 is an interface for connecting to various external devices. Examples of the external devices include, but not limited to, a universal serial bus (USB) memory and a printer. The network I/F 509 is an interface that controls communication of data with an external device through the communication network 100. The bus line 510 is an address bus, a data bus, or the like for electrically connecting each component such as the CPU 501 illustrated in FIG. 4.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or Blu-ray Disc. The media 516 controls reading and writing (storing) of data from and to a storage medium (media) 515 such as a flash memory.

Hardware Configuration of Consumption Control Device:

FIG. 4 is a schematic diagram of a hardware configuration of the consumption control device according to the exemplary embodiment. Each hardware element of the consumption control device 6 is denoted by a reference numeral in 600 series. As illustrated in FIG. 4, since the consumption control device 6, which is implemented by a computer, has substantially the same configuration as the control server 5, description of hardware configuration thereof is omitted.

Hardware Configuration of Node:

FIG. 4 is a schematic diagram also illustrating an example of hardware configuration of the node according to the exemplary embodiment. Each hardware element of the node 9 is denoted by a reference numeral in 900 series. As illustrated in FIG. 4, since the node 9, which is implemented by a computer, has substantially the same configuration as the control server 5, description of hardware configuration thereof is omitted.

Figure 5:
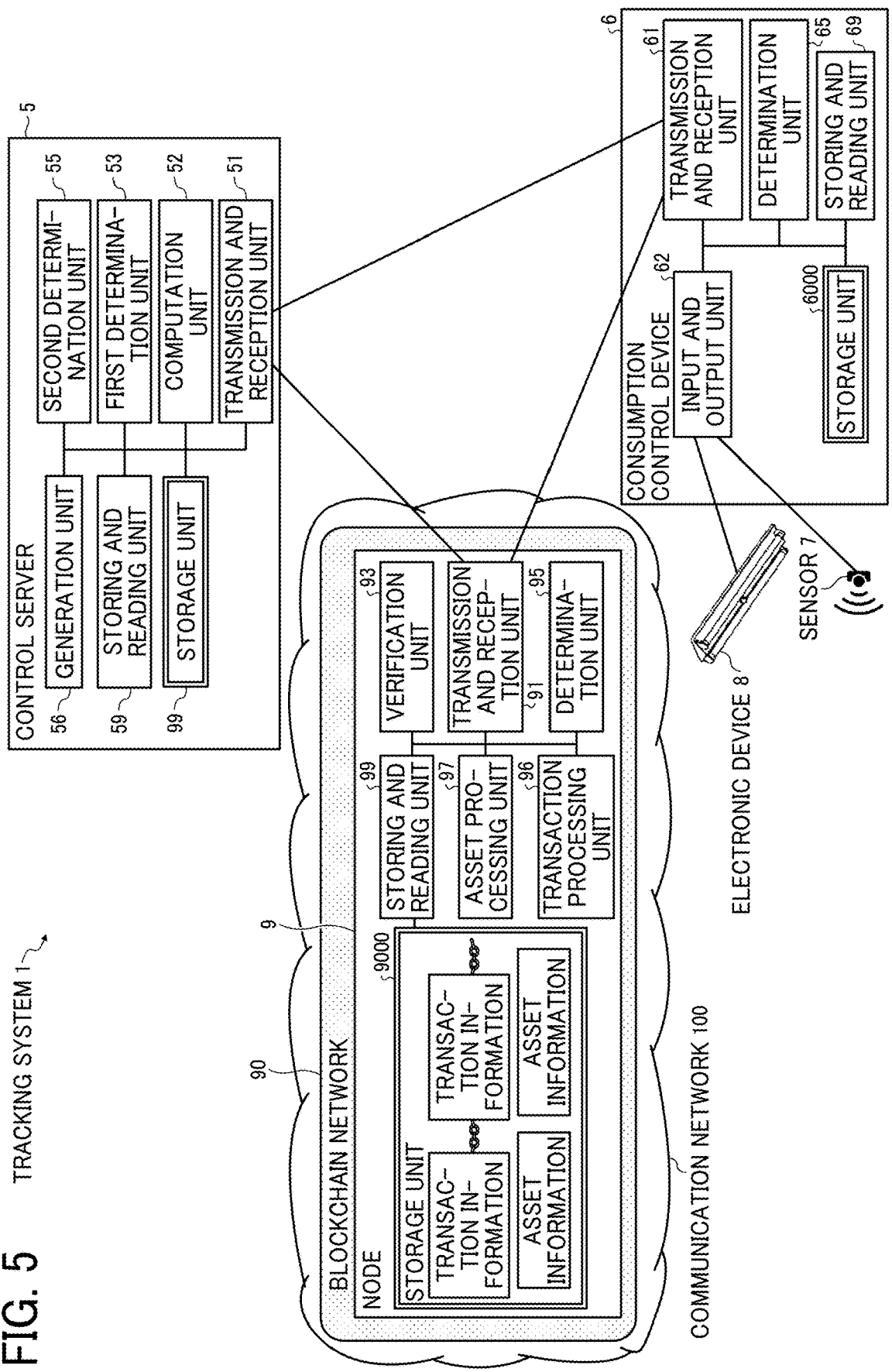
FIG. 5 is a schematic block diagram illustrating a functional configuration of the control server, the consumption control device, and the node in the tracking system according to the exemplary embodiment.

Functional Configuration:

Next, referring to FIG. 5, a functional configuration of each terminal and device of the tracking system 1 is described according to the present embodiment. FIG. 5 is a schematic block diagram illustrating a functional configuration of the control server 5, the consumption control device 6, and the node 9 in the tracking system 1 according to the exemplary embodiment.

Functional Configuration of Control Server:

As illustrated in FIG. 5, the control server 5 includes a transmission and reception unit 51, a computation unit 52, a first determination unit 53, a second determination unit 55, a creation unit 56, and a storing and reading unit 59. These units are caused to function by operating one or more hardware components illustrated in FIG. 4 in cooperation with instructions of the CPU 501 according to the control program for the control server loaded from the HD 504 to the RAM 503.

Further, the control server 5 includes a storage unit 5000 implemented by the ROM 502 and the HD 504 illustrated in FIG. 4.

Function Units of Control Server:

The transmission and reception unit 51 of the control server 5, which is implemented mainly by instructions of the CPU 501 with respect to the network I/F 509, controls transmission or reception of various data (or information) to or from other devices via the communication network 100.

The computation unit 52, which is implemented by instructions of the CPU 501, performs various calculations. Detailed of the calculations is described later.

The first determination unit 53 is implemented by instructions of the CPU 501 and makes various determinations. Details of the determination made by the first determination unit 53 are described later.

The second determination unit 55, which is implemented by the instructions of the CPU 501, makes various determinations. Details of the determinations made by the second determination unit 55 are described later.

The generation unit 56 is implemented by instructions of the CPU 501 and performs various types of generation. Details of the various types of generation are described later.

The storing and reading unit 59, which is implemented by instructions of the CPU 501, stores various data or information in the storage unit 5000 or reads out various data or information from the storage unit 5000.

Functional Configuration of Consumption Control Device:

As illustrated in FIG. 5, the consumption control device 6 includes a transmission and reception unit 61, an input and output unit 62, a determination unit 65, and a storing and reading unit 69. These units are caused to function by operating one or more hardware components illustrated in FIG. 4 in cooperation with instructions of the CPU 601 according to the control program for the consumption control device loaded from the HD 604 to the RAM 603.

The consumption control device 6 further includes a storage unit 6000, which is implemented by the ROM 602 or the HD 604 illustrated in FIG. 4.

Functional Units of Consumption Control Device:

The transmission and reception unit 61 of the consumption control device 6, which is implemented by instructions of the CPU 601 with respect to the network I/F 609, controls transmission or reception of various data (or information) to or from the servers or the nodes via the communication network 100.

The input and output unit 62 is implemented by instruction of the CPU 601 with respect to the external device connection I/F 608 and inputs or outputs information from or to external devices (for example, the sensor 7 or the electric device 8). The input and output unit 62 may also be referred to as an acquisition unit that acquires data from an external device. Further, the input and output unit 62 may perform data communication by a short-range wireless technology such as Wi-Fi, NFC, or BLUETOOTH.

The determination unit 65, which is implemented by the instructions of the CPU 601, makes various determinations.

The storing and reading unit 69, which is implemented by instructions of the CPU 601, stores various data or information in the storage unit 6000 or reads out various data or information from the storage unit 6000.

Functional Configuration of Node 9:

As illustrated in FIG. 5, the node 9 includes a transmission and reception unit 91, a verification unit 93, a determination unit 95, a transaction processing unit 96, an asset processing unit 97, and a storing and reading unit 99. These units are caused to function by operating one or more hardware components illustrated in FIG. 4 in cooperation with instructions of the CPU 901 according to the control program for the node loaded from the HD 904 to the RAM 903.

The node 9 further includes a storage unit 9000, which is implemented by the ROM 902 and the HD 904 illustrated in FIG. 4. For descriptive purposes, FIG. 5 illustrates a state in which transaction information is connected like a chain. The node 9 further stores asset information generated based on the transaction information. The transaction information and the asset information are stored in each node.

Function Units of Node:

Next, each functional unit of the node 9 is described in detail with reference to FIG. 5. The transmission and reception unit 91 of the node 9, which is implemented mainly by instructions of the CPU 901 with respect to the network I/F 909, controls transmission or reception of various data (or information) to or from other nodes of the blockchain network 90 on the communication network 100. The transmission and reception unit 91 transmits or receives various data (or information) between the transmission and reception unit 61 of the consumption control device 6 and the transmission and reception unit 51 of the control server 5.

The verification unit 93, which is implemented by the instructions of the CPU 901, verifies the certificate and the provided information. The certificate verification is a process of determining whether or not a target certificate is a certificate of the entity that is registered in advance in the node 9. The verification of the provided information is a process of determining whether or not all predetermined contents are entered in predetermined format (for example, whether the supplier is entered, or the provision time period is entered).

The determination unit 95, which is implemented by the instructions of the CPU 901, makes various determinations.

The transaction processing unit 96, which is implemented by the instructions of the CPU 901, performs processing such as generating transaction information indicating a transaction causing generation of asset information and storing the transaction information in the storage unit 9000.

The asset processing unit 97, which is implemented by the instructions of the CPU 901, performs processing such as generating asset information according to the transaction information and storing the asset information in the storage unit 9000.

The storing and reading unit 99, which is implemented by instructions of the CPU 901, stores various data or information in the storage unit 9000 or reads out various data or information from the storage unit 9000.

Processes or Operation:

Referring to FIG. 6 to FIG. 9, a description is given of an operation or processes according to the present embodiment.

First, the smart meter 3*a* of the producer A transmits, to the control server 5, supply amount data indicating an amount of electricity generated by the power generator 4 (S61). On the consumer C side, the electric device 8 transmits to the consumption control device 6 data on the electricity consumption (consumption data) and data on the setting value (setting value data) (S62). Further, the sensor 7 transmits data on the sensor value (sensor value data) to the consumption control device 6 (S63).

Then, the transmission and reception unit 61 of the consumption control device 6 transmits electricity consumption related data (power consumption related data) to the control server 5. The electricity consumption related data includes the data (consumption amount data, set value data, and sensor value data) acquired in steps S62 and S63.

A schematic diagram of electricity consumption related data is illustrated in FIG. 7. FIG. 7 is a diagram illustrating an example of the electricity consumption related data under conditions in which home electric appliances (electric devices) 8*a* and 8*b* and sensors 7*a* and 7*b* are provided on a floor A1 and a home electric appliance 8*c* and a sensor 7*c* are provided on a floor A2.

Basically, any format is used for the power consumption related data transmitted by the consumption control device 6 of the consumer C, as long as the data can be transmitted. In the example of FIG. 7, the data is described for each floor and to be sent in a format of JavaScript Object Notation (JSON). In the format of JSON, information indicated in the example may be described, and other information may be described. As for information on each home appliance, the information may include information on a manufacturer and a device name. In addition, the information may include information on electricity consumption (power consumption). In the example of FIG. 7, the floors are classified into as general office rooms. As one of the floors, a server room or the like may be specified. In general, people (humans) do not enter the server room, so that a temperature of the server room is set at a lower temperature than other rooms in order to cool a machine without. Information indicating the above-described situation may be included, and this may help to prevent someone from changing the temperature of the server room for a purpose of saving power without permission, resulting in keeping the temperature in the server room at an appropriate temperature. In addition, a room in which people who do not like strong air conditioned room gather may be specified as a room with soft air conditioned. In addition to the classification of floors, there may be a pattern of classification by a type of home appliances (air conditioner, lighting apparatus, etc.).

The electricity consumption related data may include at least one of consumption amount data, setting value data, and sensor value data, or may include data other than the consumption amount data, the setting value data, and the sensor value data.

Next, the control server 5 executes processing of generating consumption control data (S65). Referring to FIG. 8, the processing of generating consumption control data is described. FIG. 8 is a flowchart illustrating a process of generating consumption control data according to the exemplary embodiment.

First, in the control server 5, as illustrated in FIG. 8, the computation unit 52 calculates a difference between a total supply amount indicating a total amount of electricity supplied by all producer mediated by the intermediate agent D and a total consumption amount indicating a total amount of electricity consumed by all users (consumers) mediated by the intermediate agent D (S101).

Next, the second determination unit 55 determines whether the total consumption amount is greater than the total supply amount ("total consumption amount>total supply amount"). That is, whether the total consumption amount exceeds the total supply amount is determined (S102). In a case where the total consumption amount exceeds the total supply amount (S102: YES), the first determination unit 53 sets priority on users (consumers) for requesting electricity consumption reduction, namely determines an order of users (consumers) from among the users (consumers) to request for electricity consumption control (consumption reduction) (S103). To determine the order of consumers, or to set the priority on the consumers, to request for consumption reduction, reference data such as a table that is prepared in advance and indicates an order determined according to details of contract with each consumer may be used. Alternatively, a priority in relation to requesting for the consumption reduction may be quantified as reference data, and a consumer who has a high quantified number in the reference data may be set with high priority for the requesting. For example, to reduce the electricity (power) used in a hospital or a server room in which a large number of personal computers (PCs) are installed may be difficult, but to temporarily stop a factory line may be relatively easy. Such matters are taken into account to determine the order, or set the priority.

The computation unit 52 further calculates an electricity consumption reduction amount for each user (consumer) to be requested according to the order. The electricity consumption reduction amount is calculated for each user from the top of the order of users until a condition in which the total consumption amount is equal to or less than the total provision amount is satisfied (S104).

Next, the first determination unit 53 determines a specific electrical device corresponding to each user (consumer) for which the consumption reduction amount is calculated and a consumption reduction amount for the specific electric device (S105). In this case, the control server 5 compares the latest electricity consumption related data received in the step S64 with prior electricity consumption related data that is previously acquired from the consumption control device of each consumer who has a transaction contract, thereby determining which electric device to reduce the electricity consumption and how much of the electricity consumption of the electric device is to be reduced. As described above, by using the prior electricity consumption related data acquired from other consumers who have transaction contracts, the accuracy of the determination is expected to be improved the more an amount of such prior electricity consumption related data becomes.

For example, when the latest electricity consumption related data indicates that a set temperature of the electric device 8 (air conditioner) in summer is sufficiently low and a temperature detected by the sensor 7 (temperature sensor) is close to the set temperature, the first determination unit 53 determines to increase a value of the set temperature of the air conditioner so that the set temperature is same as the value of an average temperature obtained from the prior electricity consumption data associated with other consumers. When a value obtained by the sensor 7 (illuminance sensor) provided in proximity to a window indicates that the brightness is sufficiently ensured, the first determination unit 53 determines to decrease a value of the illuminance of the electric device 8 (lighting apparatus) so that the brightness becomes the same as that of another place in the same consumer. When there is a floor on which the sensor 7 (human detecting sensor) detects no person, the first determination unit 53 determines to decrease the illuminance of the electric device 8 (lighting apparatus) of the floor.

In addition, the first determination unit 53 may determine an electricity reduction value by comparing general statistical data with the latest electricity consumption related date received in step S64 without using the prior electricity consumption related data received from the consumers having the transaction contracts.

For example, in a case of cooling of the air conditioner, when a set temperature is changed by 1 degree, the electricity consumption changes by 13%, in a general. In addition, in a case of heating of the air conditioner, when a set temperature is changed by 1 degree, the electricity consumption changes by 10%, in a general. The control server 5 may use the above-described general control information to determine which electric device to reduce the electricity consumption and how much amount the determined electric device is to reduce the electricity consumption. In addition, the control server 5 may combine the prior electricity consumption related data and general control information to determine which electric device to reduce the electricity consumption and how much amount the determined electric device is to reduce the electricity consumption. As described above, a determination is made using the prior electricity consumption related data or the general control information. As a result, the electricity consumption reduction (electricity consumption control) may be performed without giving negative impression to the consumer. Further, for example, the reduction effect varies between a store and an office in changing a temperature setting. There is statistical data indicating that approximately 5% of reduction is possible in a case of a store and approximately 10% of reduction is possible in the case of an office when a set temperature increases by 2 degrees. Such the above-described statistical data may be used by the first determination unit 53 to determine the electricity reduction amount.

Finally, the generation unit 56 generates consumption control data based on the determination of step S105 (S106).

Figure 6:
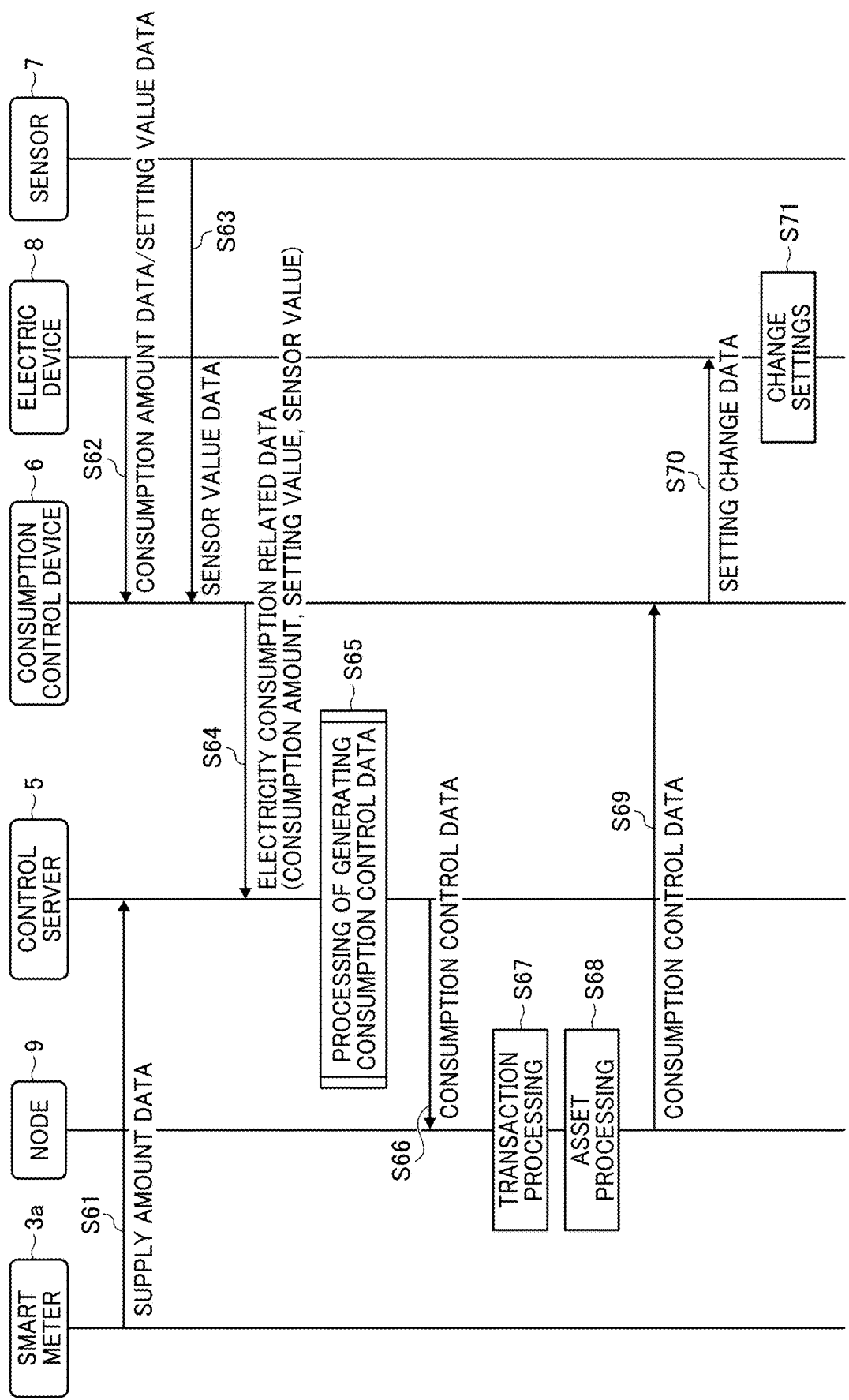
FIG. 6 is a sequence diagram illustrating a process of performing electricity consumption control according to the exemplary embodiment.

After generating the consumption control data, the processing of step S65 in FIG. 6 ends.

Subsequently, the transmission and reception unit 51 of the control server 5 transmits the consumption control data generated in step S106 to the transmission and reception unit 91 of the node 9 (S66).

Subsequently, in the node 9, after the verification unit 93 verifies the validity of the control server 5, the transaction processing unit 96 generates first transaction information illustrated as illustrated in FIG. 9 based on the consumption control data received in step S66 (S67). Then, the asset processing unit 97 generates asset information as illustrated in FIG. 9 based on the first transaction information (S68).

As illustrated in FIG. 9, in a ledger of the blockchain, the history of data is recorded on a chain and managed as transaction information, namely records of data are managed on a chain as transaction information. Alternatively, in many cases, in order to extract the latest data, information is managed as an asset. In such cases, the transaction information includes all records of data, and the asset information includes the latest data indicating the latest values. According to such cases, what is first written as the transaction information (first transaction information) is a "electricity consumption reduction (control) request" of the intermediary agent D. The "electricity consumption reduction (control) request" indicates that to which consumer the consumption reduction is to be requested and how much amount of electricity consumption reduction is to be requested. When the consumer complies with the consumption reduction, "electricity consumption reduction (control) acceptance" is further written as the transaction information (second transaction information). The latest state of each data is managed in the form of an asset. There is a case in which the consumption control may not be accepted by a consumer depending on a situation, and there is a case in which the consumption amount may not be reduced more than expected even when the setting is changed for the consumption reduction. For this reason, meaning of the power consumption control acceptance may include not only to completely achieve to reduce the requested amount, but also to achieve to reduce some of the requested amount.

Each of the asset information and the transaction information illustrated in FIG. 9 is an example. Information (data) other than these pieces of information (data) may be stored, or may be stored in a different data format. For example, the asset information and the transaction information may be written in a data format of a JSON format, or may be written such that a consumption reduction amount is written without specifying an electric device as a consumption request destination.

Next, the transmission and reception unit 91 of the node 9 transmits the consumption control data received in step S66 to the transmission and reception unit 61 of the consumption control device 6 (S69).

Next, the input and output unit 62 of the consumption control device 6 outputs setting change data generated based on the consumption control data to the electric device 8 (S70). Accordingly, the electric device 8 changes the settings based on the setting change data (S71). For example, when the consumption control data indicates to reduce the electricity consumption of the electric device 8*a* by 2.0 kWh, the setting change data indicates to change the settings such that a set temperature is decreased by 2 degrees that are corresponding to the reduction of 2.0 kWh.

In some embodiments, the consumption control data transmitted to the consumption control device 6 indicates a consumption reduction amount to be requested to the consumer C and to be reduced without indicating which electric device 8 to reduce the electricity consumption. In this case, the consumption control device 6 may determine which electric device 8 to reduce the electricity consumption.

As described above, after the settings of the electric device 8 is changed, the processing of steps S62 to S66 is performed again after the situation changed according to the change of the settings. In step S67, the transaction processing unit 96 generates the second transaction information as illustrated in FIG. 9. Further, in step S68, the asset processing unit 97 changes the asset information as illustrated in the lower right of FIG. 9.

As described above, according to the above-described embodiment, the electricity consumption of the consumer C is controlled without increasing the production of electricity by the producer A. This prevents increasing a supply cost for ensuring balancing between supply and demand of the electricity.

In addition, the control server 5 instructs the consumers C to reduce electricity consumption and instructs one or more specific electric devices of the consumer C to reduce the electricity consumption (see step S69), the consumer C do not need to consider which one or more electric devices to reduce the electricity consumption.

In particular, the power supply according to the electricity (power) production using the renewable energy resources such as solar light and wind power is unstable as compared with the power supply according to the power production using nuclear power, thermal power, or the like. Due to this, in the power production using the renewable energy resources, a large number of power generation apparatuses (power generation facilities) are to be installed, and an increase in the power supply cost becomes significant, accordingly. According to the above-described embodiment, by performing power consumption control with respect to the consumer C, even when a rate of power production using renewable energy resources increases, it is easy to secure balancing between supply and demand of the electricity.

In addition, the blockchain network 90 according to the above-described embodiment has records of data on the consumption control (consumption reduction) and keeps the records as an evidence. This allows the users (consumers) to easily to be certified with the evidence for consumption reduction (electricity/power consumption reduction) to receive benefits such as grant money or subsidy from countries with respect to the consumption reduction (electricity/power consumption reduction). In addition, the intermediary agent D may prepare a special power plan that includes cooperation for power adjustment with respect to consumers, resulting in being differentiated from other company services.

Further, in any one of the above-described embodiments, electricity is used as an example of asset, which is an item having value.

Each of the above-described hardware components, like CPU 201, 301, 501, and 901, may be a single device or a plurality of devices.

Each of the functions of the described embodiments may be implemented by one or more processing circuits or circuitry. Here, the "processing circuit" in the present embodiment includes a processor programmed to execute each function by software, such as a processor implemented by an electronic circuit, and devices such as an application specific integrated circuit (ASIC), a digital signal processor (DSP), a field programmable gate array (FPGA), a system on a chip (SOC), a graphics processing unit (GPU), and a conventional circuit module designed to execute each function described above.

Further, the power generator 4 may be additionally provided with a smart meter 3a, or has a function of the smart meter 3a (3b). Alternatively, or additionally, the electric device 8 may be provided with the smart meter 3c, or has a function of the smart meter 3c.

Further, any of the above-described programs may be stored in a recording medium such as a DVD for distribution.

Further, communication of data between the smartphone 2 (or the smart meter 3), the control server 5, the consumption control device 6, and the node 9 may be performed via any other server.

When a power generation device is additionally provided to cope with the peak of the electricity usage in order to secure the balancing between the supply and the demand of the electricity, a supply cost for the electricity increases.

As described above, according to the above-described embodiment, by performing the electricity consumption control, an increase of the electricity supply cost, which may occur in order to secure the balancing between the supply and the demand of the electricity, is avoided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A control server, comprising
circuitry configured to:
  receive, via a communication network, electricity consumption related data from a plurality of consumption control devices of a plurality of users, the electricity consumption related data of each consumption control device including records of electricity consumption of one or more electric devices of a corresponding one of the plurality of users;
  determine whether a total amount of electricity consumed by the plurality of users is greater than a total amount of electricity provided by a plurality of producers;
  based on a determination that the total amount of electricity consumed is greater than the total amount of electricity provided, calculate a first electricity consumption reduction amount for each of one or more users of the plurality of users, according to an order of a priority set on the plurality of users from a top to one until a condition is satisfied, the condition being that the total amount of electricity consumed is equal to or less than the total amount of electricity provided;
  determine, for each of the one or more users, one or more specific electric devices among from the one or more electric devices and a second electricity consumption reduction amount of each of the one or more specific electric devices, based on the electricity consumption related data and reference data;
  generate, for each of the one or more users, consumption control data including information on the one or more specific electric devices and the second electricity consumption reduction amount of each of the one or more specific electric devices; and
  transmit to, each of specific one or more consumption control devices of the one or more users, the consumption control data to cause each of the one or more consumption control devices to perform electricity consumption control in relation to the one or more specific electric devices.

2. The control server of claim 1, wherein
the electricity consumption related data includes at least one of electricity consumption amount data, setting value data, or sensor value data,
the electricity consumption amount data including an electricity consumption amount associated with the one or more specific electric devices,
the setting value data including setting values for operation of the specific one or more electricity devices, and
the sensor value data including a value obtained by a sensor provided in proximity to each of the one or more electric devices.

3. The control server of claim 1, wherein
the circuitry transmits the consumption control data via a blockchain network on which item information associated with the consumption control data is generated.

4. A tracking system, comprising:
the control server of claim 1, and
a consumption control device included in the one or more specific one of the plurality of consumption control devices, the consumption control device including consumption control device circuitry configured to
transmit, to the control server, the electricity consumption related data,
receive, from the control server, the consumption control data, and
output, to the one or more specific electric devices, setting change data for performing consumption control of the one or more specific electric devices, the setting change data being based on the consumption control data received from the control server.

5. A communication method, comprising:
receiving, via a communication network, electricity consumption related data from a plurality of consumption control devices of a plurality of users, the electricity consumption related data of each consumption control device including records of electricity consumption of one or more electric devices of a corresponding one of the plurality of users:
determining whether a total amount of electricity consumed by the plurality of users is greater than a total amount of electricity provided by a plurality of producers;

based on a determination that the total amount of electricity consumed is greater than the total amount of electricity provided, calculating a first electricity consumption reduction amount for each of one or more users of the plurality of users, according to an order of a priority set on the plurality of users from a top to one until a condition is satisfied, the condition being that the total amount of electricity consumed is equal to or less than the total amount of electricity provided;

determining, for each of the one or more users, one or more specific electric devices among from the one or more electric devices and a second electricity consumption reduction amount of each of the one or more specific electric devices, based on the electricity consumption related data and reference data;

generating for each of the one or more users, consumption control data including information on the one or more specific electric devices and the second electricity consumption reduction amount of each of the one or more specific electric devices; and transmitting to, each of specific one or more consumption control devices of the one or more users, the consumption control data to cause each of the one or more consumption control devices to perform electricity consumption control in relation to the one or more specific electric devices.

6. A non-transitory recording medium storing a plurality of instructions which, when executed by one or more processors, causes the processors to perform a method, the method comprising:

receiving, via a communication network, electricity consumption related data from a plurality of consumption control devices of a plurality of users, the electricity consumption related data of each consumption control device including records of electricity consumption of one or more electric devices of a corresponding one of the plurality of users;

determining whether a total amount of electricity consumed by the plurality of users is greater than a total amount of electricity provided by a plurality of producers;

based on a determination that the total amount of electricity consumed is greater than the total amount of electricity provided, calculating a first electricity consumption reduction amount for each of one or more users of the plurality of users, according to an order of a priority set on the plurality of users from a top to one until a condition is satisfied, the condition being that the total amount of electricity consumed is equal to or less than the total amount of electricity provided;

determining, for each of the one or more users, one or more specific electric devices among from the one or more electric devices and a second electricity consumption reduction amount of each of the one or more specific electric devices, based on the electricity consumption related data and reference data;

generating for each of the one or more users, consumption control data including information on the one or more specific electric devices and the second electricity consumption reduction amount of each of the one or more specific electric devices; and transmitting to, each of specific one or more consumption control devices of the one or more users, the consumption control data to cause each of the one or more consumption control devices to perform electricity consumption control in relation to the one or more specific electric devices.

* * * * *